US012193419B2

(12) United States Patent
 Jankiewicz et al.

(10) Patent No.: US 12,193,419 B2
(45) Date of Patent: Jan. 14, 2025

(54) WATER FILTER FOR AN AQUARIUM

(71) Applicant: Aquael Sp. z o.o., Warsaw (PL)

(72) Inventors: Janusz Jankiewicz, Warsaw (PL); Jerzy Brzeski, Raszyn (PL); Stanislaw Konter, Warsaw (PL)

(73) Assignee: AQUAEL Sp. z.o.o., Warsaw (PL)

( * ) Notice: Subject to any disclaimer, the term of this patent is extended or adjusted under 35 U.S.C. 154(b) by 931 days.

(21) Appl. No.: 17/050,185

(22) PCT Filed: Apr. 25, 2019

(86) PCT No.: PCT/IB2019/053417
 § 371 (c)(1),
 (2) Date: Oct. 23, 2020

(87) PCT Pub. No.: WO2019/207522
 PCT Pub. Date: Oct. 31, 2019

(65) Prior Publication Data
 US 2021/0100224 A1    Apr. 8, 2021

(30) Foreign Application Priority Data

Apr. 26, 2018  (PL) .......................... 425372

(51) Int. Cl.
 *A01K 63/04*    (2006.01)
 *B01D 46/00*    (2022.01)
(52) U.S. Cl.
 CPC ........ *A01K 63/045* (2013.01); *B01D 46/0004* (2013.01)
(58) Field of Classification Search
 None
 See application file for complete search history.

(56) References Cited

U.S. PATENT DOCUMENTS

| 187,982 | A | * | 3/1877 | Pirsson et al. | ......... | F16L 37/32 |
| | | | | | | 137/614.02 |
| 430,721 | A | * | 6/1890 | Winkler | ................. | F16L 37/12 |
| | | | | | | 137/614.04 |

(Continued)

FOREIGN PATENT DOCUMENTS

IT    1277398 A1    1/2003

OTHER PUBLICATIONS

International Search Report in PCT/IB2019/053417 dated Jul. 19, 2019.

(Continued)

*Primary Examiner* — Robert J Popovics
(74) *Attorney, Agent, or Firm* — Ralph E. Jocke; WALKER & JOCKE

(57) ABSTRACT

Exemplary embodiments relate to a water filter for an aquarium that includes a housing, a cover, a removable first and second body, and an actuator. The housing includes an interior area configured to house filtration cartridges and an opening closable by the cover. The first body is configured to be in operative fluid connection with a water inlet and the second body is configured to be in operative fluid connection with the housing interior area through the cover, and is operatively releasably engageable therewith. The first and second bodies are releasably engageable in fluid tight connection, and each include a valve in operative connection therewith. The actuator is in operative connection with at least one of the valves and operation thereof is operative to simultaneously change each valve between the respective open and closed positions.

20 Claims, 7 Drawing Sheets

(56) References Cited

U.S. PATENT DOCUMENTS

| | | | | |
|---|---|---|---|---|
| 879,880 A * | 2/1908 | Landau | F16L 37/32 | 285/317 |
| 2,178,182 A * | 10/1939 | Mellinger | F16K 11/16 | 137/865 |
| 2,440,946 A * | 5/1948 | Hansen | F16L 29/002 | 137/628 |
| 2,482,873 A * | 9/1949 | Roberts | F16K 5/0278 | 251/249 |
| 2,537,965 A * | 1/1951 | Cantin, Jr. | B01D 35/26 | 210/451 |
| 2,729,337 A * | 1/1956 | Alferman | A01K 63/045 | 210/123 |
| 2,872,216 A * | 2/1959 | Kaiser | F16L 37/26 | 251/102 |
| 2,948,553 A * | 8/1960 | Gill | F16L 37/373 | 137/614.02 |
| 2,991,090 A * | 7/1961 | De Cenzo | F16L 37/373 | 285/321 |
| 3,159,180 A * | 12/1964 | Courtot | F16L 37/373 | 137/614.06 |
| 3,273,717 A * | 9/1966 | Canterbury | A01K 63/045 | 415/121.2 |
| 3,371,789 A * | 3/1968 | Hense | A01K 63/04 | 210/167.25 |
| 3,382,892 A * | 5/1968 | Cerbin | F16L 37/373 | 285/70 |
| 3,418,973 A * | 12/1968 | Saito | A01K 63/04 | 392/471 |
| 3,458,441 A * | 7/1969 | Dockery | B01D 37/02 | 210/444 |
| 3,545,490 A * | 12/1970 | Burrus | E21B 33/038 | 137/614.06 |
| 3,688,907 A * | 9/1972 | Oravec | E04H 4/1645 | 210/167.26 |
| 3,785,342 A * | 1/1974 | Rogers | A01K 63/045 | 119/264 |
| 3,921,656 A * | 11/1975 | Meisenheimer, Jr. | F16K 17/386 | 137/75 |
| 4,265,751 A * | 5/1981 | Willinger | A01K 63/045 | D23/209 |
| 4,267,042 A * | 5/1981 | Hofmann | A01K 63/045 | 210/489 |
| 4,276,905 A * | 7/1981 | Lourdeaux | F16K 27/067 | 415/151 |
| 4,335,747 A * | 6/1982 | Mitsumoto | F16L 59/18 | 251/142 |
| 4,351,351 A * | 9/1982 | Flory | F16L 55/1015 | 251/149.7 |
| 4,354,522 A * | 10/1982 | Bormioli | F16L 27/0828 | 285/1 |
| 4,438,779 A * | 3/1984 | Allread | F16L 37/113 | 285/85 |
| 4,483,368 A * | 11/1984 | Panthofer | F16L 37/32 | 251/149.6 |
| 4,515,182 A * | 5/1985 | LeDevehat | F16L 55/1007 | 285/1 |
| 4,559,136 A * | 12/1985 | Dockery | A01K 63/045 | 210/416.2 |
| 4,577,659 A * | 3/1986 | Gembus | F16L 25/00 | 137/637.05 |
| 4,601,821 A * | 7/1986 | Sherman | A01K 63/047 | 210/493.1 |
| 4,622,997 A * | 11/1986 | Paddington | F16L 37/62 | 137/595 |
| 4,687,016 A * | 8/1987 | Takahashi | F16L 37/002 | 137/240 |
| 4,818,396 A * | 4/1989 | Wolf | B01D 35/306 | 210/232 |
| 4,857,191 A * | 8/1989 | Wolf | B01D 35/30 | 210/287 |
| 4,890,643 A * | 1/1990 | Oliver | F16K 5/0605 | 137/637.1 |
| 4,895,646 A * | 1/1990 | Willinger | A01K 63/045 | 210/167.25 |
| 5,083,588 A * | 1/1992 | Truchet | F16L 29/04 | 137/637.05 |
| 5,090,449 A * | 2/1992 | Fournier | F16L 37/373 | 137/637.05 |
| 5,099,883 A * | 3/1992 | Maiville | F16L 37/373 | 285/87 |
| 5,294,335 A * | 3/1994 | Chiang | A01K 63/045 | 210/418 |
| 5,332,001 A * | 7/1994 | Brown | F16L 37/36 | 251/96 |
| 5,401,401 A * | 3/1995 | Hickok | A01K 63/045 | 210/453 |
| 5,402,825 A * | 4/1995 | McCracken | F16L 37/373 | 137/614.01 |
| 5,449,454 A * | 9/1995 | Hickok | A01K 63/045 | 210/438 |
| 5,474,674 A * | 12/1995 | Bresolin | A01K 63/045 | 210/232 |
| 5,488,972 A * | 2/1996 | McCracken | F16L 37/373 | 137/614.01 |
| 5,505,428 A * | 4/1996 | De Moss | F16L 37/47 | 251/368 |
| 5,507,313 A * | 4/1996 | LeDevehat | F16L 55/1007 | 137/614.05 |
| 5,507,469 A * | 4/1996 | Soderberg | F16K 5/0647 | 251/248 |
| 5,567,315 A * | 10/1996 | Weidenmann | A01K 63/045 | 210/123 |
| 5,615,707 A * | 4/1997 | Pfannenschmidt | F16L 37/30 | 137/637.1 |
| 5,807,480 A * | 9/1998 | Kanazawa | A01K 63/045 | 210/150 |
| 6,056,011 A * | 5/2000 | Bormioli | F16L 55/1007 | 137/614.01 |
| D428,109 S * | 7/2000 | Mayer | D23/210 | |
| 6,187,179 B1 * | 2/2001 | Mayer | A01K 63/045 | 417/199.2 |
| 6,220,290 B1 * | 4/2001 | Lomax | F16L 37/373 | 137/613 |
| 6,254,769 B1 * | 7/2001 | Whittaker | B01D 29/668 | 210/232 |
| 6,298,876 B1 * | 10/2001 | Bogdonoff | F16L 37/18 | 137/614.04 |
| 6,375,833 B1 * | 4/2002 | Marston | A01K 63/045 | 210/85 |
| 6,585,888 B2 * | 7/2003 | Axelrod | A01K 63/045 | 119/260 |
| 6,645,376 B2 * | 11/2003 | Marioni | A01K 63/045 | 210/429 |
| 6,681,802 B2 * | 1/2004 | McHugh | F16K 11/0873 | 137/613 |
| 6,712,961 B2 * | 3/2004 | Chauquet | A01K 63/045 | 210/419 |
| 6,764,597 B2 * | 7/2004 | Chauquet | B01D 29/01 | 210/416.1 |
| 6,945,273 B2 * | 9/2005 | Reid | F16L 37/244 | 251/149.9 |
| 6,984,320 B2 * | 1/2006 | Bartkus | C02F 9/20 | 220/756 |
| D517,644 S * | 3/2006 | Mayer | D23/210 | |
| 7,276,169 B2 * | 10/2007 | Marioni | B01D 36/001 | 210/167.21 |
| 7,306,111 B2 * | 12/2007 | Koslow | B01D 35/1475 | 210/450 |
| 7,325,286 B2 * | 2/2008 | Bormioli | F16L 37/62 | 285/39 |
| 7,399,407 B2 * | 7/2008 | Marioni | B01D 29/15 | 210/167.25 |
| 7,560,021 B2 * | 7/2009 | Marioni | F16K 17/065 | 210/424 |
| 7,651,070 B2 * | 1/2010 | Ruprecht | B01D 35/30 | 210/420 |

(56) References Cited

U.S. PATENT DOCUMENTS

| | | | | |
|---|---|---|---|---|
| 7,699,074 B2* | 4/2010 | Lomax | F16K 5/0631 | 137/613 |
| 8,082,947 B2* | 12/2011 | Chang | F16K 31/535 | 251/249 |
| 8,132,781 B2* | 3/2012 | Haunhorst | F16L 37/373 | 251/149.9 |
| 8,201,574 B2* | 6/2012 | Beasley | F16K 27/067 | 251/192 |
| 8,662,108 B2* | 3/2014 | Haunhorst | F16L 37/0841 | 251/248 |
| 8,814,137 B2* | 8/2014 | Wong | F16L 37/18 | 251/149.9 |
| 8,887,762 B2* | 11/2014 | Densel | F16L 37/36 | 251/149.9 |
| 8,967,177 B2* | 3/2015 | Haunhorst | F16L 37/36 | 137/614.01 |
| 9,043,997 B2* | 6/2015 | Agresta | B01D 29/56 | |
| 9,044,699 B2* | 6/2015 | Gale | B01D 35/30 | |
| 9,140,410 B2* | 9/2015 | Malnou | F17C 13/04 | |
| 9,303,774 B2* | 4/2016 | Lomax | F16K 5/201 | |
| 9,388,929 B2* | 7/2016 | Lewis | A61B 5/02233 | |
| 9,393,509 B2* | 7/2016 | Li | B01D 35/153 | |
| 9,814,220 B2* | 11/2017 | Van Amerongen | C02F 1/001 | |
| 10,080,352 B2* | 9/2018 | AlThumayri | A01K 63/045 | |
| 10,934,695 B2* | 3/2021 | Warsowe | E03C 1/052 | |
| 11,306,828 B2* | 4/2022 | Chen | F16K 27/067 | |
| 11,346,453 B2* | 5/2022 | Brandt | F16K 11/165 | |
| 11,684,048 B2* | 6/2023 | Jankiewicz | B01D 35/30 | 210/136 |
| 2002/0179512 A1* | 12/2002 | Axelrod | A01K 63/045 | 210/167.25 |
| 2003/0015464 A1* | 1/2003 | Marioni | A01K 63/045 | 119/259 |
| 2003/0102036 A1* | 6/2003 | Sosa | F16K 5/0605 | 137/315.2 |
| 2003/0164324 A1* | 9/2003 | Chauquet | B01D 29/90 | 210/234 |
| 2003/0189184 A1* | 10/2003 | York | F16K 31/122 | 251/250 |
| 2005/0218086 A1* | 10/2005 | Marioni | B01D 24/12 | 210/167.22 |
| 2006/0049086 A1* | 3/2006 | Axelrod | A01K 63/045 | 210/167.22 |
| 2006/0096900 A1* | 5/2006 | Marioni | F16K 17/065 | 210/97 |
| 2006/0157395 A1* | 7/2006 | Marioni | B01D 29/54 | 210/170.02 |
| 2007/0029239 A1* | 2/2007 | Jankiewicz | A01K 63/045 | 210/167.21 |
| 2007/0209986 A1* | 9/2007 | Axelrod | A01K 63/045 | 210/167.25 |
| 2009/0173284 A1* | 7/2009 | Yoo | A01K 63/10 | 119/259 |
| 2010/0140522 A1* | 6/2010 | Chang | F16K 35/14 | 251/315.16 |
| 2011/0290708 A1* | 12/2011 | Renoud-Grappin | A01K 63/045 | 210/232 |
| 2013/0000763 A1* | 1/2013 | Haunhorst | F16L 37/36 | 137/15.22 |
| 2013/0032234 A1* | 2/2013 | Densel | F16L 37/36 | 137/798 |
| 2013/0213867 A1* | 8/2013 | Agresta | B23P 6/00 | 210/167.25 |
| 2015/0048017 A1* | 2/2015 | Li | B01D 35/153 | 210/236 |
| 2015/0257372 A1* | 9/2015 | Agresta | B23P 6/00 | 29/402.03 |
| 2016/0120156 A1* | 5/2016 | Van Amerongen | A01K 63/045 | 210/167.22 |
| 2017/0013812 A1* | 1/2017 | AlThumayri | C02F 1/00 | |
| 2021/0068376 A1* | 3/2021 | Jankiewicz | A01K 63/045 | |
| 2021/0100224 A1* | 4/2021 | Jankiewicz | A01K 63/045 | |

OTHER PUBLICATIONS

Written Opinion of International Search Authority in PCT/IB2019/053417.

* cited by examiner

WATER FILTER FOR AN AQUARIUM

TECHNICAL FIELD

The exemplary embodiments relate to a water filter for an aquarium. Exemplary embodiments further relate to a water filter used in external water filtration systems in aquaria for fish farming and in waterholes.

BACKGROUND

In general, in external filters for purification of water in aquaria and waterholes, contaminated water is introduced into the filter and passes a sequence of levels and types of filtration and then, upon purification, it is guided back to the water reservoir in fluid communication with the filter.

As a general rule, such filters constitute separate, i.e. external, components of equipment of an aquarium, positioned close to the aquarium or waterhole with which they operate. Such filters are connected to water circulation effected in them by means of conduits which are arranged within connection ports secured within the cover of the filter. These ports constitute entrance elements of water inlet and water outlet arrangements in the filter, and are provided with valves. During removal of the connection ports from the cover, for example, for washing and periodic inspection or servicing of the filter components, the valves housed therein have to remain in their closed position. Changes in the valve position front open to closed and vice versa, are effected most frequently by an additional activating element, for example by a lever.

Water filters for aquaria and waterholes may benefit from improvements.

SUMMARY

An exemplary water filter for an aquarium according to exemplary embodiments comprises a housing in the form of a container that has an open top. The exemplary housing includes filtration cartridges arranged therein and a cover secured to the housing. The exemplary cover includes, operatively arranged therein, a priming arrangement and removable connection ports of water inlet and water outlet arrangements. The exemplary water inlet and water outlet arrangements are provided with valves. The exemplary water inlet comprises a first valve and a second valve, while the exemplary water outlet arrangement comprises a first valve and a second valve. The exemplary first valves and exemplary second valves are coupled by an exemplary drive transmission mechanism.

In exemplary embodiments, the exemplary first valves and the exemplary second valves are rotary valves.

In exemplary embodiments, the exemplary first valves and the exemplary second valves are ball valves.

In exemplary embodiments, the exemplary first valve comprises a body and is connected to a connection port and arranged in the filter cover.

In exemplary embodiments, the exemplary second valve comprises a body and is fixed within the cover, downstream the first valve, at the connection port positioned in the cover.

In exemplary embodiments, the exemplary drive transmission mechanism is a gear transmission mechanism.

In exemplary embodiments, the exemplary drive transmission mechanism comprises a rotatable (also referred to herein as an actuator) lever with a rack (also referred to herein as a gear segment) and a cooperating toothed wheel (also referred to herein as a gear segment). The exemplary lever with the rack is seated in a bearing in the body of the first valve and the toothed wheel is seated in a bearing in the body of the second valve.

In exemplary embodiments, the exemplary body of the first valve is surrounded by a jacket in which an opening for lever rotation is formed.

In exemplary embodiments, the exemplary body of the second valve has a locking plug, formed above the toothed wheel, which in the position of a connection port inserted within the cover is arranged above the envelope of the rack.

In exemplary embodiments, the exemplary filter has a chamber of a roughing filter, which is formed within the cover, separately relative to the position of the water inlet and water outlet arrangements within the cover.

In exemplary embodiments, the exemplary water inlet arrangement has at least one check valve which is arranged downstream the water inlet arrangement and upstream the chamber of the roughing filter.

In exemplary embodiments, the exemplary at least one check valve comprises check valves comprised of a first closing flap and a second closing flap.

In exemplary embodiments, the exemplary filtration cartridges are arranged in containers.

The exemplary embodiments relate to an exemplary double construction of valves in the water inlet and water outlet arrangements that significantly enhances the comfort of use of the filter. The exemplary embodiments relate to an external water filter for purification of water in an aquarium that eliminates splashing of water during detachment of connection ports. The exemplary embodiments have also unexpectedly produced an exemplary arrangement that includes two valves in the inlet and outlet water circulation arrangement which makes it possible to use an additional filtration chamber formed in the cover, i.e. above the main filtration cartridges heretofore arranged exclusively within the filter housing.

DETAILED DESCRIPTION

Exemplary arrangements may include certain prior art structures. For example, document US 2003164324 A1 discloses an external filter for water purification in an aquarium encompassing a housing with filtration cartridges and a cover secured thereto, and provided with connection ports for water conduits from and to an aquarium reservoir. Both connection ports, i.e. the inlet port and the outlet port, respectively, are connected to each other in one module and they comprise ball valves. Upon detachment of the module from the filter cover, the valves in the ports are also removed. A change in the operation mode of the inlet and outlet valves, i.e. from the opened operation mode to the closed operation mode and vice versa, is effected concurrently by means of an articulated joint formed with the ports in the module. The document US 2003164324 A1 is incorporated herein by reference in its entirety.

Another example of structures for an external filter for water purification that may be used in exemplary arrangements in an aquarium is disclosed in the document US 2015048017 A1. Connection ports are connected to the corresponding valves and they are together secured in a body that may be removed from a cover. The operational mode of the valves is changed concurrently by means of an activating arrangement with a rotatable handle. The document US 2015048017 A1 is incorporated herein by reference in its entirety.

These examples of external filters for water purification in an aquarium lack a solution to prevent burdensome splashing of water from the filter during detachment of the connection ports from the cover by a user.

The exemplary embodiments presented herein relate to an exemplary improved construction of an external water filter for an aquarium, in which, during detachment of connection ports from the cover, no splashing of water from the filter occurs, which overcomes the problems associated with the prior art external filters. The exemplary embodiments include additional improvements over the prior art as well.

Figure 1:
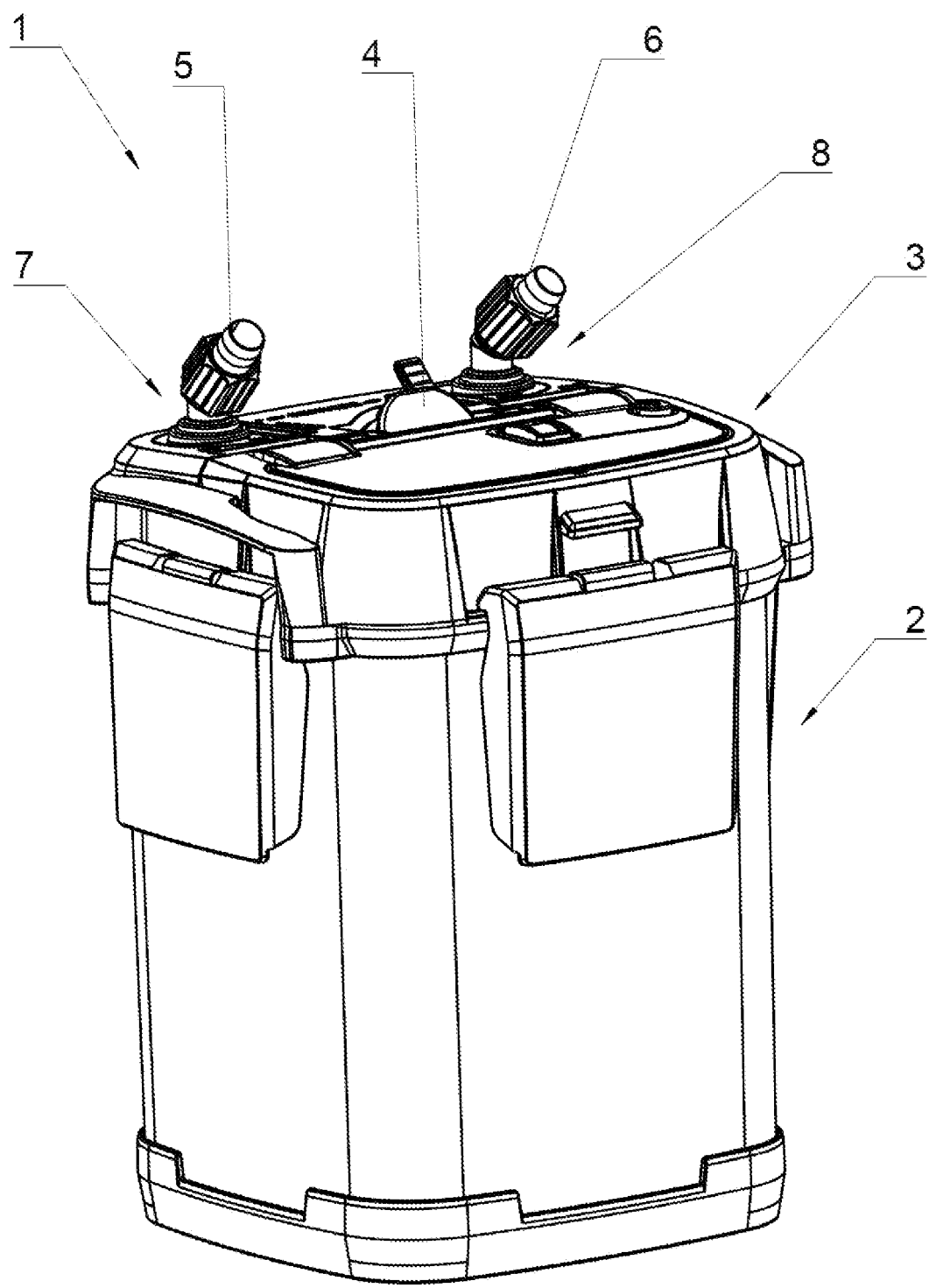
FIG. 1 shows a perspective view of an exemplary water filter for an aquarium according to the exemplary embodiments.

As shown in FIG. 1 an exemplary water filter 1 for an aquarium encompasses a housing 2 and a cover 3 secured thereto, with, seated thereon, a piston of a priming arrangement 4 (also referred to herein as a priming pump). The exemplary filter 1 further includes connection ports 5, 6 of water inlet 7 and water outlet 8 arrangements. The exemplary connection ports 5 and 6 are detachable from the cover 3.

Figure 6:
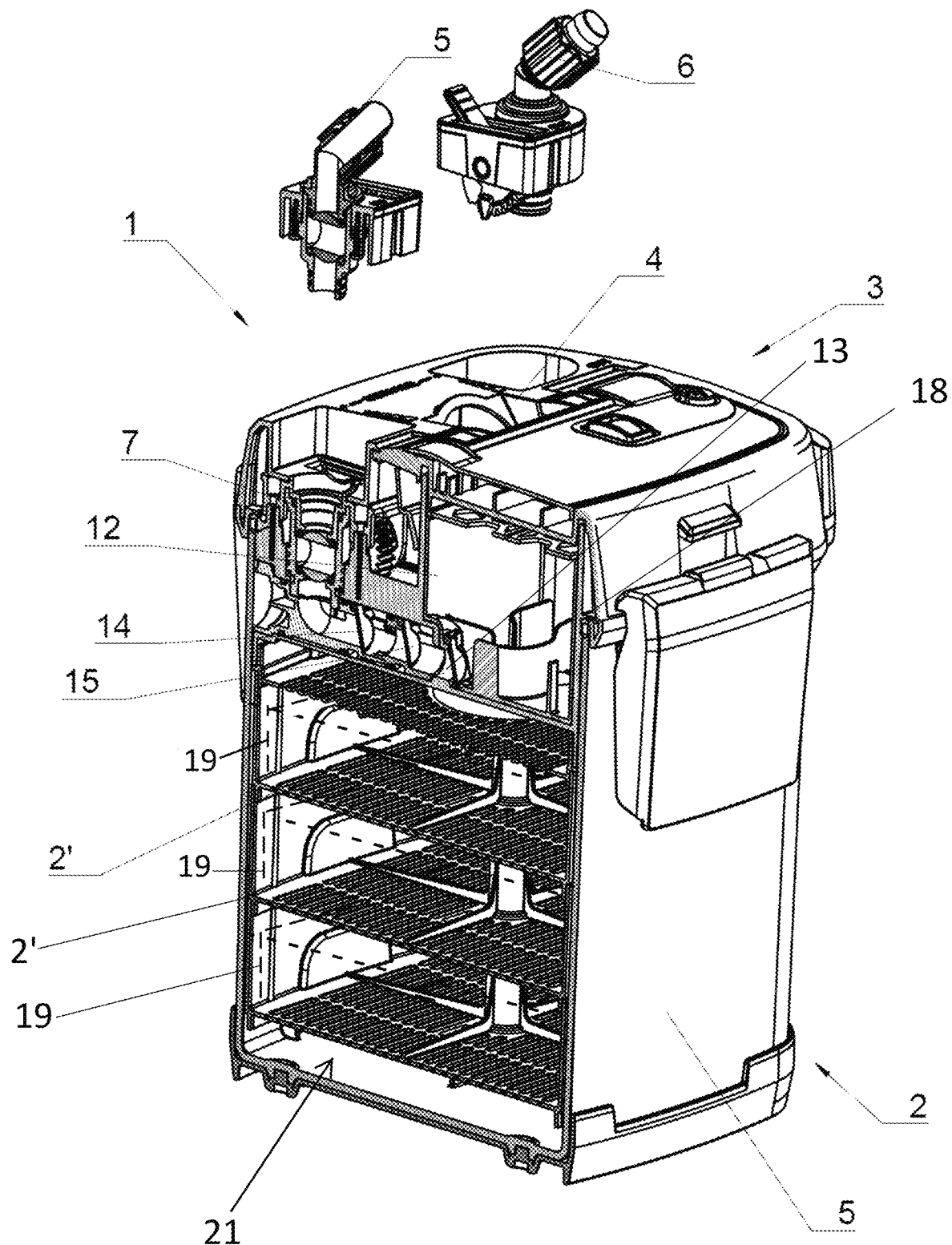
FIG. 6 shows a detailed cross-sectional view illustrating an exemplary water inlet arrangement and an exemplary chamber of a roughing filter.
Figure 7:
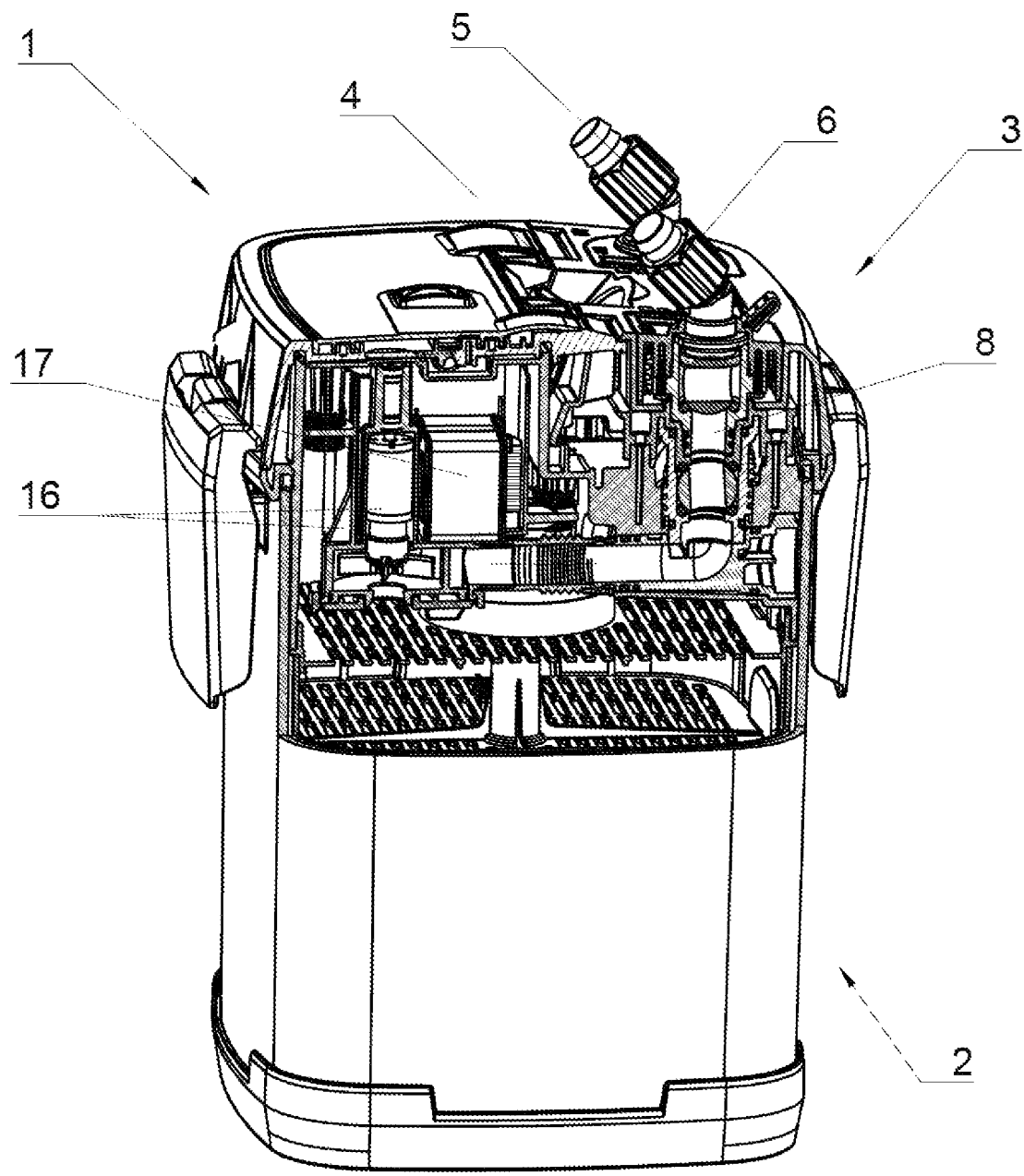
FIG. 7 shows a detailed cross-sectional view illustrating an exemplary water outlet arrangement.

According to exemplary embodiments, the exemplary housing 2 is formed as a vertical canister type container that is open through an opening 18 at its top. The exemplary housing 2 includes a housing interior area 21 that is configured to house a plurality of replaceable filtration cartridges 19 (shown in phantom in FIG. 6) that are operatively arranged therein, and which may be standard filtration media, such as for example, activated carbon or foam cartridges. The exemplary filtration cartridges 19 are operatively positioned in exemplary removable containers 2' that (as shown in FIG. 6 or 7) may be operatively removably arranged within the housing 2, one above another to form a vertical pattern of sequenced levels of filtration cartridges.

Figure 2:
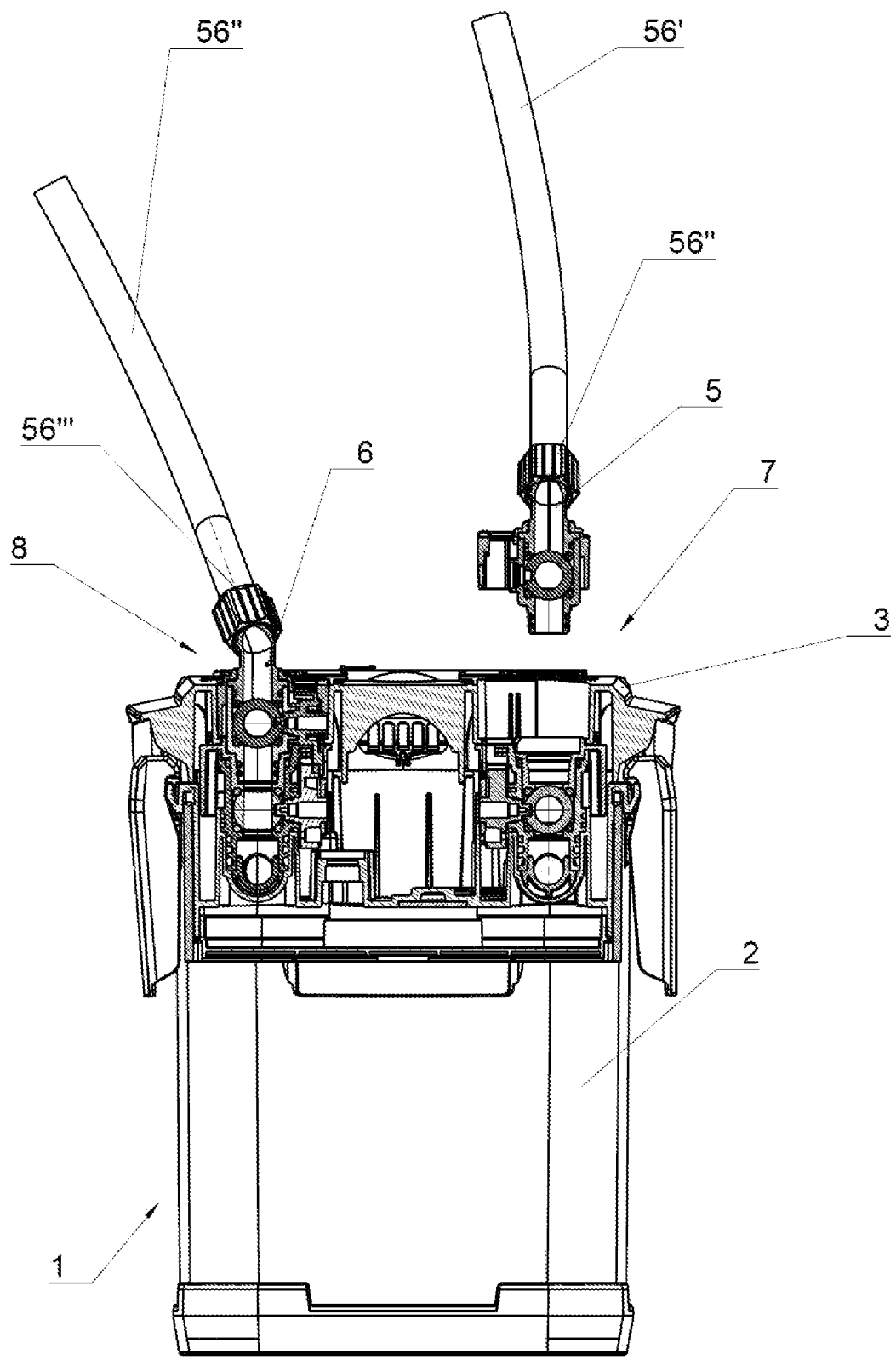
FIG. 2 shows a partial simplified cross-sectional view of an exemplary filter illustrating exemplary water inlet and exemplary water outlet arrangements.

FIG. 2 shows a partial and simplified cross-sectional view of an exemplary filter 1 illustrating the structure and reciprocal positioning of the exemplary cover 3 of the exemplary water inlet 7 and water outlet 8 arrangements. The exemplary removable connection ports 5, 6 are operatively releasably mounted to the cover 3 for the water inlet 7 and water outlet 8 arrangements, respectively. The mentioned ports 5, 6 are connected to a water draining conduit 56' (also referred to herein as a fluid inlet) and a water feeding conduit 56" (also referred to herein as a fluid outlet), from and to the reservoir of an aquarium or a waterhole (not show where the filter 1 operates. For better connection of the exemplary conduits 56', 56", the connection ports 5, 6 (according to FIG. 3) are terminated with pressure nuts 56'''.

The exemplary water inlet 7 and exemplary water outlet 8 arrangements each have an identical exemplary construction in which the water inlet 7 and the water outlet 8 each include a removable first body and a removable second body and two ball valves. The first body includes a first valve or a first movable valve element, and the second body includes a second valve or a second movable valve element. The structure and operation mode of the first body and the second body and their respective valves are illustrated in detail in FIGS. 3, 4 and 5a and 5b. Due to the exemplary constructional correspondence of the removable bodies and their respective valve arrangements, the exemplary structure of the water inlet 7 arrangement and the water outlet 8 arrangement will be presented below through a detailed description of an exemplary embodiment of the exemplary water inlet 7 arrangement only. It should be understood that the water outlet 8 has an identical exemplary construction, with the only difference being that it's first body is in operative fluid connection with the fluid outlet, as opposed to the fluid inlet, which is in operative fluid connection with the first body of the water inlet 7. Wherefore, analogous constructive elements within the valve assemblies, use identical reference signs.

Figure 3:
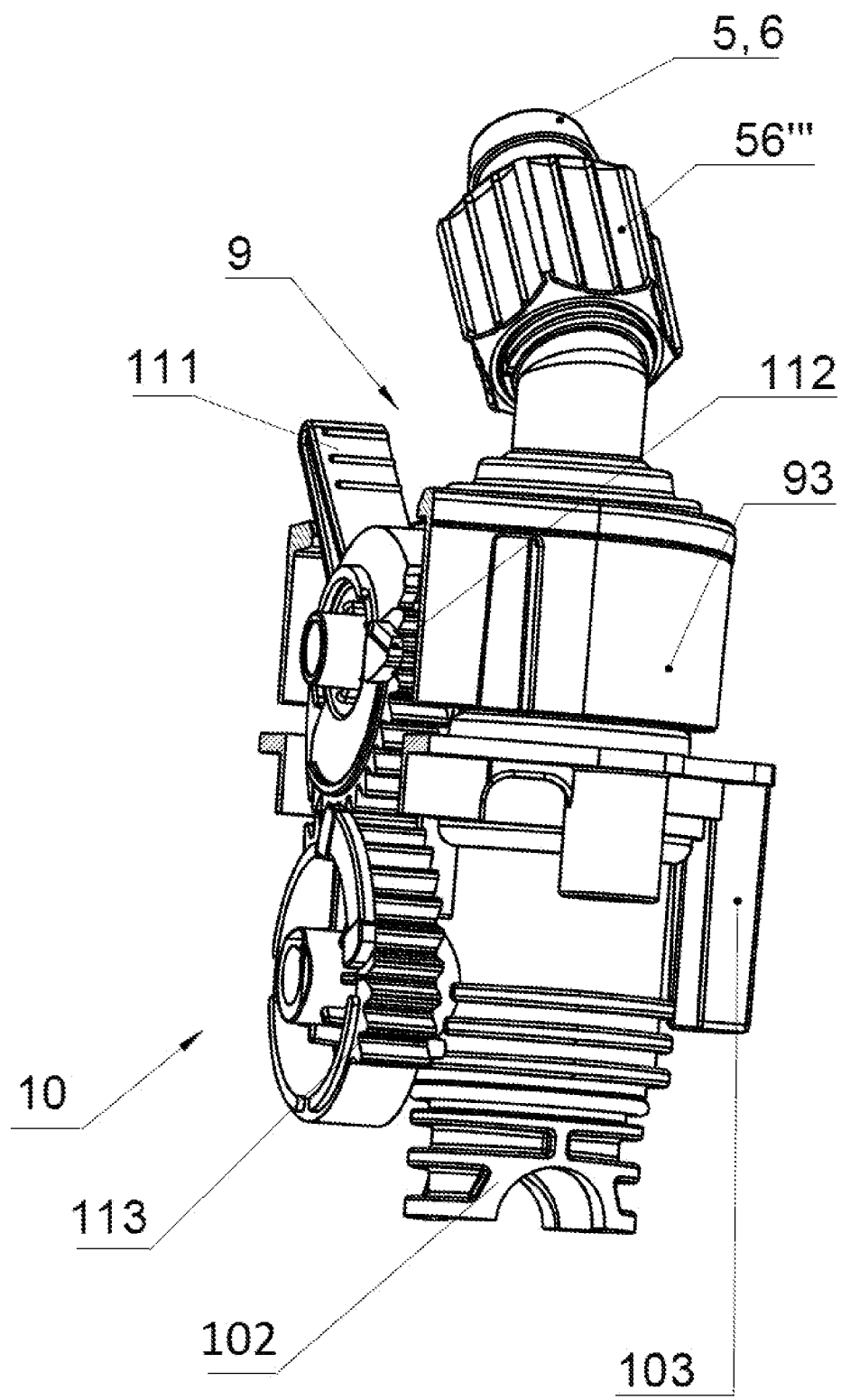
FIG. 3 shows a perspective view of exemplary valves used in water inlet and water outlet arrangements.
Figure 4:
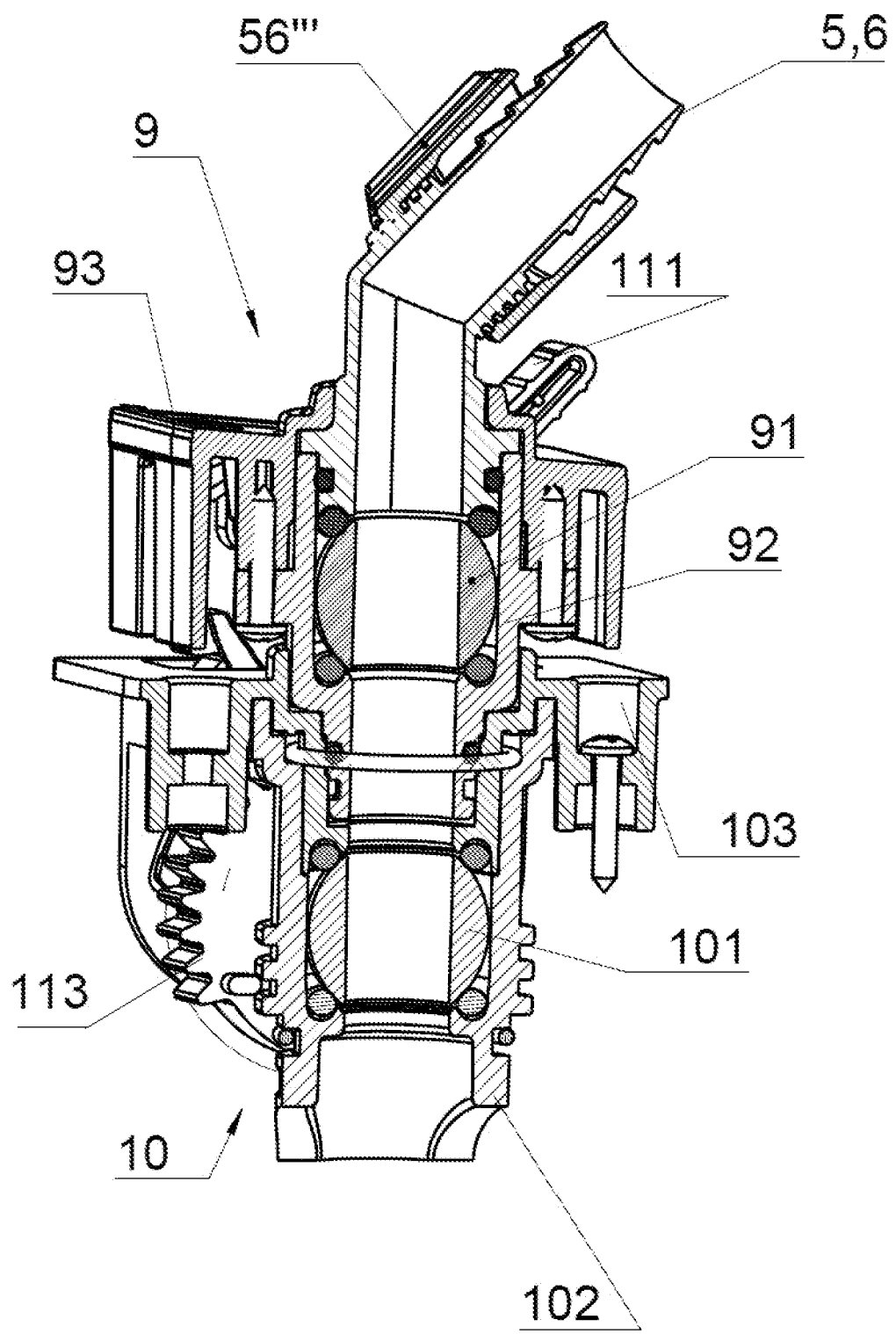
FIG. 4 shows a cross-sectional view of exemplary valves used in water inlet and water outlet arrangements.

According to FIGS. 3 and 4, in a first body 92 of the exemplary connection port 5, 6, an exemplary first valve 9 is defined. An exemplary ball 91 (also referred to herein as the first movable valve element) of the exemplary first valve 9 is arranged within the body 92, and is seated from the inside on a sleeve of the connection port 5, 6, and from the outside it is surrounded by a jacket 93. The exemplary connection port 5, 6 with the first valve 9 is operatively positioned within the cover 3 in a removable manner. The lower end of the body 92 protruding below the jacket 93 portion is operatively releasably engageable with, or coupled with, in fluid tight relation, the upper section of the conduit of the water inlet 7 arrangement (or the water outlet 8 arrangement), i.e. with the second body 102 that includes the second ball valve, or second valve 10, which within the cover 3 of the filter 1 is surrounded from the top by a jacket 103 secured in the cover 3. The first valve 9 and the second valve 10 are changeable between respective valve open positions and respective valve closed positions. In the open positions of the first valve 9 and the second valve 10, the movable valve elements, for example balls 91 and 101, are operatively positioned such that fluid is enabled to flow past the movable valve elements and to flow through the first body 92 and the second body 102. In the closed position of the first valve 9 and the second valve 10, the movable valve elements do not permit fluid to flow past the valve elements and through the first and second bodies.

In exemplary embodiments, the removable first body 92 is in operative fluid connection with the fluid inlet 56' and includes the first valve 9. The removable second body 102 is in operative fluid connection with the housing interior area through the cover 3 and includes the second valve 10. The first body 92 and the second body 102 are configured to be operatively releasably engageable in fluid tight relation in which the first valve 9 and the second valve 10 are in operative fluid connection. When the first body 92 and the second body 102 are operatively engaged in fluid tight relation, the fluid inlet 56' and the housing interior area are in operative fluid connection when the first valve 9 and the second valve 10 are changed from the respective valve closed positions to the respective valve open positions.

The reciprocal coupling, or simultaneous movement of the position of the exemplary valves and balls 91, 101 thereof is effected by means of a gear drive transmission mechanism 11 (also referred to herein as an actuator mechanism). According to exemplary embodiments, the exemplary drive transmission mechanism comprises a manually engageable rotatable lever 111 (also referred to herein as an actuator). The exemplary first valve 9 includes a gear a rack 112 (also referred to herein as a first valve gear segment) in fixed operative connection therewith that cooperates in operatively engaged relation with a toothed wheel 113 in operative connection with the second valve 10 (also referred to herein as the second valve gear segment). The exemplary lever 111 with the exemplary rack 112 is seated in a bearing in the body 92 of the first valve 9, while the exemplary toothed wheel 113 is seated in a bearing correspondingly in the body 102 of the second valve 10. The exemplary first valve gear segment 112 is rotatable about an axis of rotation 3C) that extends through the center of the first valve bearing. Upon positioning of the exemplary first body 92 of the connection port 5, 6 in operatively engaged fluid tight relation with the second body 102, and upon positioning of the second body in operatively engaged fluid tight relation e cover 3 of the filter 1, coupling or operative engagement of the rack 112 with the toothed wheel 113 occurs.

Rotation of the exemplary lever 111 in a first rotational direction and in an opposed rotational direction, effected within a longitudinal opening 94 in the jacket 93 of the first valve 9, allows for concurrent or simultaneous change in the operating position of the first valve 9 and the second valve 10 and their respective valve element balls 91, 101. The exemplary longitudinal opening 94 includes a lever stop 24 that is operative to prevent the lever 111 from being rotated in the first lever direction beyond a position corresponding to the open position of the valves. The exemplary longitudinal opening 94 also includes a further lever stop 26 that is operative to prevent the lever 111 from being rotated in a second lever direction opposed of the first lever direction beyond a position corresponding to the closed position of the valves. Thereby, the actuator 111 allows for a concurrent or simultaneous change in the operational modes of the valves, i.e. from an open valve position into a closed valve position and vice versa. It should be understood that the exemplary actuator 111 and stops 24 and 26 may be in operative fixed connection with the rack 112 of the first valve 9 and the first body 92, or the exemplary actuator 111 and stops 24 and 26 may be in operative fixed connection with the toothed wheel 113 of the second valve 10 and the second body 102.

Figure 5:
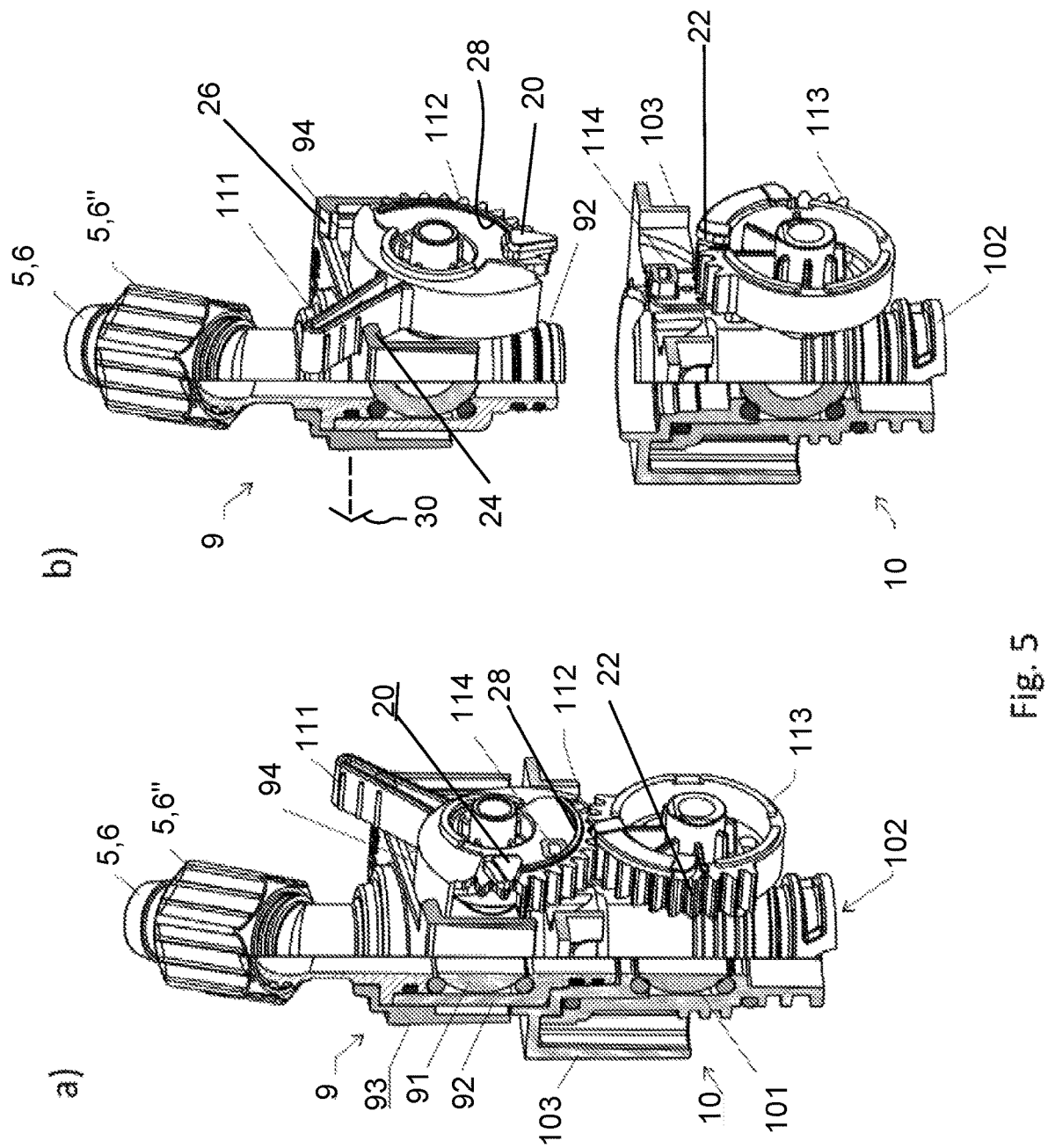
FIGS. 5a-b show exemplary valve arrangements, correspondingly in an exemplary operational mode (open position of the valves) and an exemplary mode with the exemplary connection port in a detached position (closed position of the valves).

As shown in FIG. 5, the exemplary second body 102 of the second valve 10 has an exemplary locking plug or projection 114 formed above the toothed wheel 113. When the first valve gear segment 112 and the second valve gear segment 113 are operatively engaged, the locking projection 114 is operatively radially disposed in an area between an outer toothed portion of the first valve gear segment and the axis of rotation 30 thereof. In other words, the position of the exemplary connection port 5, 6 arranged within the cover 3, the exemplary locking plug 114 is positioned above a surface which bounds the area which corresponds to the envelope of the rack 112. Rotation of the lever 111 from a closed position to the open position of the valves 9, 10 causes locking of the rack 112 under the locking plug 114, and as a result it is not possible to remove the connection ports 5, 6 during operation of the filter, nor is it possible to fluidly disengage the first body 92 and the second body 102 in an open position of both the first valve 9 and the second valve 10. Only rotation of the exemplary lever 111 back to the closed position of the valves 9, 10 allows to obtain the initial position of the rack 112 dative to the toothed wheel 113, and thereby to release the envelope of the rack 112 from beneath the locking plug 114 positioned above. In other words, in the engaged position of the first valve gear segment 112 and the second valve gear segment 113, and in the open position of the first valve 9 and the second valve 10, the locking projection 114 is in operatively blocking relation with a radially inner surface 28 of the first valve gear segment 112 adjacent the outer toothed portion such that the first body 92 the second body 102 cannot be fluidly disengaged, as shown in FIG. 5a. It should be understood that in some arrangements of a locking plug and an associated gear segment or envelope may be included on either of the body 92 or the body 102.

As shown in FIGS. 5a and 5b, the exemplary rack 112 includes a first cam 20 and the exemplary toothed wheel 113 includes a second cam 22. In order to operatively engage the exemplary first body 92 and the second body 102, the first cam 20 and the second cam have to be in operatively aligned relation such that at the instance of engagement of the first body 92 and the second body 102, the first cam 20 engages the second cam 22 in abutting relation, as would be shown in FIG. 5b if the body 92 were to be moved further downward to engage the body 102. As a result of the arrangement of the first cam 20 and the second cam 22, the rack 112 and the toothed wheel 113 will only operate to change the valves between the open position and the closed position if the first body 92 and the second body 102 are engaged in operatively aligned relation with the cams in operatively abutting engaged relation.

As such, in the engaged position of the exemplary first valve gear segment 112 and the second valve gear segment 113, and in the closed positions of the first valve 9 and the second valve 10, the first cam 20 and the second cam 22 are operatively engaged such that the first body 92 and the second body 102 are in operatively aligned relation. Further, during operation of the actuator 111 that is operative to change the first valve 9 and the second valve 10 from the closed position to the open position, the first cam 20 and the second cam 22 change from an operatively engaged position to a disengaged position, as shown in FIG. 5a. Still further, during operation of the actuator 111 that is operative to change the first valve 9 and the second valve 10 from the open position to the closed position, the first cam 20 and the second cam 22 change from the disengaged position to the operatively engaged position, as shown in FIG. 5b if the body 92 were moved further downward to engage the body 102.

Due to the concurrent change in the position of the exemplary first valve 9 and the exemplary second 10 valve, when detaching the exemplary connection ports 5, 6, both the first valve 9 and the second valve 10 will be always set in a closed position. Due to the fact that water circulation in the filter is cut-off by the closed second valve 10, during detachment of the connection ports 5, 6 water will not be splashed.

The above discussed exemplary water inlet 7 and exemplary water outlet 8 arrangements show the same construction with regard to the valve assembly. Hereinbelow the exemplary water inlet 7 and exemplary water outlet 8 arrangements are described from the point of view of the functions performed by them and cooperation with other exemplary modules of the exemplary filter 1 of the exemplary embodiments.

According to the exemplary embodiments shown, in the cover 3 of the filter 1 there is arranged, separately from the position of the water inlet 7 and water outlet 8 arrangements, an exemplary additional filtration chamber 12 which is intended to carry out mechanical rough filtration inside. The exemplary roughing filter chamber 12 is fluidly intermediate of the second valve 10 and the housing interior area. As shown in FIG. 6, the water inlet 7 arrangement is connected to the exemplary roughing filter chamber 12 by means of an outlet opening 13 formed in the rear wall of the roughing filter chamber 12. Additionally, the water inlet 7 arrangement cooperates with a priming arrangement 4 (not shown). Upstream of the exemplary roughing filter chamber 12, the water inlet 7 arrangement is equipped with two check valves to prevent water backflow during priming the filter 1. The at least one check valve is fluidly intermediate of the second valve 10 in the roughing filter chamber 12. The check valves are constituted by a first movable closing flap 14 and a second movable closing flap 15, that both permit fluid flow from the second valve 10 to the roughing filter chamber 12 and prevent backflow of water from the roughing filter chamber 12 to the second valve 10. When introduced into the roughing filter chamber 12, water is guided next, by means of an outlet opening (not shown) formed for this purpose in the chamber to filtration cartridges, arranged in containers 2', positioned in the housing 2 of the filter 1.

As shown in FIG. 7, water finally filtered inside the housing 2 is drawn by a pump 16, driven by a motor 17 and directed to a water outlet 8 arrangement terminated in a connection port 6, and then it is guided through a draining conduit 56" to a reservoir (not shown).

It should be clear that the exemplary embodiments are not limited to the above presented arrangements and that diverse modifications and developments thereof are possible.

Thus, the exemplary embodiments achieve improved operation, eliminate difficulties encountered in the use of prior art devices and systems, and obtain the useful results described herein.

In the foregoing description, certain terms have been used for brevity, clarity, and understanding. However, no unnecessary limitations are to be implied therefrom because such terms are used for descriptive purposes only and are intended to be broadly construed. Moreover, the description and illustrations herein are by way of examples only, and the new and useful concepts are not limited to the features shown and described.

It should be understood that features and/or relationships associated with one embodiment can be combined with features and/or relationships from another embodiment. That is, various features and/or relationships from various embodiments can be combined in further embodiments. The inventive scope of the disclosure is not limited to only the embodiments shown or described herein.

Having described the features, discoveries, and principles of the exemplary embodiments, the manner in which they are constructed and operated, and the advantages and useful results attained, the new and useful features, devices, arrangements, parts, combinations, systems, equipment, operations, methods, processes, and relationships are set forth in the appended claims.

The invention claimed is:

1. Apparatus comprising:
a water filter that is fluidly connectable with an aquarium, wherein the water filter comprises
a housing, wherein the housing includes a base and side walls that bound a housing interior area, and wherein the housing includes an opening to enable access to the housing interior area,
wherein the housing interior area houses a plurality of filtration cartridges,
wherein the filtration cartridges are operative to remove particles from fluid passing therethrough,
a cover, wherein the cover is releasably engageable with the housing and when engaged is operative to close the housing opening, wherein the cover includes in operatively attached connection therewith,
a fluid inlet,
a first valve body,
a second valve body,
wherein the first valve body is in operative fluid connection with the fluid inlet,
wherein the first valve body includes therein a first movable valve element,
wherein the second valve body
is in fixed operatively attached connection with the cover,
is in operative fluid connection with the housing interior area, and
includes therein a second movable valve element,
wherein the first valve body and the second valve body are manually releasably engageable in fluid tight relation, wherein when the first valve body and the second valve body are operatively engaged in fluid tight relation
with the first valve element and the second valve element each in a respective open position, fluid is enabled to pass through each of the first valve body and the second valve body, and
with the first valve element and the second valve element each in a respective closed position, fluid is prevented from passing through each of the first valve body and the second valve body,
a manual actuator, wherein the actuator is in fixed operative connection with one of the first valve element or the second valve element,
wherein when the first valve body and the second valve body are not engaged in fluid tight relation, only the one first valve element or second valve element is movable between a respective open position and closed position responsive to manual movement of the actuator, and
wherein when the first valve body and the second valve body are engaged in fluid tight relation, the first valve element and the second valve element are in operative connection such that the actuator is manually accessible from outside the housing and manual movement of the actuator is operative to cause each of the first valve element and the second valve element to simultaneously change between their respective open and respective closed positions such that the first and second valve elements are either simultaneously each in the open position or in the closed position.

2. The apparatus according to claim 1
wherein the first valve element and the second valve element each have a respective gear segment in fixed operative connection therewith,
wherein when the first valve body and the second valve body are operatively engaged in fluid tight relation, a first gear segment in fixed operative connection with the first valve element and a second gear segment in fixed operative connection with the second valve element are operatively meshingly engaged.

3. The apparatus according to claim 2
wherein the second valve body includes a locking projection in fixed operative connection therewith,
wherein when the first gear segment and the second gear segment are operatively meshingly engaged, and the first and second valve elements are both in the respective open position, the locking projection is radially disposed between an outer toothed portion of the first gear segment and an axis of rotation of the first gear segment,
whereby the locking projection is operative to hold the first valve body and the second valve body in operatively engaged fluid tight relation.

4. The apparatus according to claim 3
wherein the first gear segment includes a first cam,
wherein the second gear segment includes a second cam,
wherein when the first and second gear segments are meshingly engaged and the first and second valve elements are each in the closed position, the first cam and the second cam are operatively engaged such that the first valve body and the second valve body are in operatively aligned and engaged in fluid tight relation.

5. The apparatus according to claim 4
wherein during movement of the actuator that is operative to change each of the first and second valve elements from the closed position to the open position, the first cam and the second cam change from an operatively engaged position to a disengaged position.

6. The apparatus according to claim 5
wherein during movement of the actuator that is operative to change each of the first and second valve elements from the open position to the closed position, the first cam and the second cam change from the disengaged position to the operatively engaged position.

7. The apparatus according to claim 3
wherein when the first and second gear segments are meshingly engaged and each of the first and second valve elements are in the open position,
the locking projection prevents relative axial movement of the first and second valve bodies by being in operatively blocking relation with a radially inner surface of the first gear segment immediately radially inwardly adjacent to the outer toothed portion of the first gear segment, whereby the first valve body and the second valve body cannot be fluidly disengaged.

8. The apparatus according to claim 7
wherein the actuator comprises a manually rotatable lever that is in fixed operative connection with the first valve element,
wherein with the first and second valve gear segments meshingly engaged and in the closed position of each of the first and second valve elements, manual rotation of the lever in a first lever direction is operative to cause each of the first and second valve elements to change from the respective closed position to the respective open position.

9. The apparatus according to claim 8
wherein the first valve body includes a lever stop,
wherein the lever stop is operative to prevent the lever from being rotated in the first lever direction beyond a position corresponding to the open position of each of the first and second valve elements.

10. The apparatus according to claim 9
wherein the first valve body includes a further lever stop,
wherein the further lever stop is operative to prevent the lever from being rotated in a second lever direction opposed of the first lever direction beyond a further position corresponding to the closed position of each of the first and second valve elements.

11. The apparatus according to claim 10
wherein at least one of the first valve element and the second valve element comprises a ball valve element.

12. The apparatus according to claim 10
wherein the cover further includes a roughing filter chamber,
wherein the roughing filter chamber is fluidly intermediate of an outlet of the second valve body and the housing interior area.

13. The apparatus according to claim 12
wherein the cover further includes at least one check valve,
wherein the at least one check valve is operatively positioned fluidly intermediate of the outlet of the second valve body and the roughing filter chamber.

14. The apparatus according to claim 13
wherein the at least one check valve comprises a first movable closing flap and a second movable closing flap,
wherein the first and second movable closing flaps permit fluid flow from the outlet of the second valve body to the roughing filter chamber, and wherein the first and second movable closing flaps prevent backflow of fluid from the roughing filter chamber to the outlet of the second valve body.

15. The apparatus according to claim 14, and further comprising:
a plurality of filtration cartridge containers removably positioned in the housing interior area,
wherein each of the filtration cartridges is operatively removably positioned in a respective filtration cartridge container.

16. The apparatus according to claim 15
wherein the cover further includes in operatively attached connection therewith,
a fluid outlet,
a first outlet valve body,
a second outlet valve body,
wherein the first outlet valve body is in operative fluid connection with the fluid outlet,
wherein the first outlet valve body includes therein a first movable outlet valve element,
wherein the second outlet valve body
is in fixed operatively attached connection with the cover,
is in operative fluid connection with the housing interior area, and
includes therein a second moveable outlet valve element,
wherein the first outlet valve body and the second outlet valve body are manually releasably engageable in fluid tight relation, wherein when the first outlet valve body and the second outlet valve body are operatively engaged in fluid tight relation,
with the first outlet valve element and the second outlet valve element each in a respective open position, fluid is enabled to pass through each of the first outlet valve body and the second outlet valve body, and
with the first outlet valve element and the second outlet valve element each in a respective closed position, fluid is prevented from passing through each of the first outlet valve body and the second outlet valve body,
a further manual actuator,
wherein the further manual actuator is in fixed operative connection with the first outlet valve element, wherein when the first outlet valve body and the second outlet valve body are engaged in fluid tight relation, the first outlet valve element and the second outlet valve element are in operative connection such that the further actuator is manually accessible from outside the housing and manual movement of the further actuator is operative to cause each of the first outlet valve element and the second outlet valve element to simultaneously change between their respective open position and respective closed position such that the first and second outlet valve elements are either simultaneously each in the open position or in the closed position.

17. The apparatus according to claim 1
wherein the first valve element and the second valve element each include a respective gear segment in fixed operative connection therewith,
wherein when the first valve body and the second valve body are operatively engaged in fluid tight relation, a first gear segment in fixed operative connection with the first valve element and a second gear segment in fixed operative connection with the second valve element are operatively meshingly engaged,
wherein at least one of the first valve body and the second valve body includes a locking projection in fixed operative connection therewith,
wherein when the first gear segment and the second gear segment are operatively meshingly engaged, and the first valve element and the second valve element are each in the open position, the locking projection is operatively radially disposed between an axis of rotation and an outer toothed portion of the respective gear segment of the valve body that is included on the other of the first valve body and the second valve body that includes the locking projection,
whereby the locking projection is operative to prevent disengagement from fluid tight relation of the first and second valve bodies.

18. The apparatus according to claim 17
wherein with the first and second gear segments meshingly engaged and with each of the first and second valve elements in the open position,
the locking projection is in operatively blocking relation with a radially inner surface of the gear segment of the valve body that is included on the other of the first valve body and the second valve body that does not have the locking projection in fixed operative connection therewith, and is immediately radially inwardly adjacent the outer toothed portion thereof, whereby the first valve body and the second valve body cannot be fluidly disengaged.

19. Apparatus comprising:
a water filter fluidly connectable to an aquarium, wherein the water filter comprises
a housing, wherein the housing bounds a housing interior area that includes an upper opening to enable access thereto,
wherein the housing interior area houses a plurality of replaceable filtration cartridges, wherein the filtration cartridges are replaceable through the upper opening,
wherein the filtration cartridges are operative to remove particles from fluid passing therethrough,
a removable cover, wherein the removable cover is operative to selectively close the upper opening,
a fluid inlet operative to receive water to be filtered,
a first valve body,
a second valve body,
wherein the first valve body includes a first body inlet operative to receive water from the fluid inlet,
wherein the first valve body is manually releasably engageable in fluid tight connection with the second valve body,
wherein the second valve body is permanently operatively engaged with the cover, and the second valve body includes a second valve body outlet, wherein the second valve body outlet is operative to deliver fluid to the housing interior area,
wherein the first valve body includes a first movable valve element therein,
wherein the second valve body includes a second movable valve element therein,
wherein the first movable valve element and the second movable valve element are each changeable between a respective open position and a respective closed position,
wherein in the respective open position of each of the first and second movable valve elements, fluid is enabled to flow past the respective first and second movable valve elements and respectively through the first valve body and the second valve body,
wherein in the respective closed position of each of the first and second movable valve elements, fluid is prevented from flowing through the respective first valve body and the second valve body,
a manually engageable movable lever,
wherein the lever is in operative fixed connection with the first movable valve element, and
wherein when the first valve body and second valve body are not engaged in fluid tight connection, manual movement of the lever is operative to move only the first valve element between the respective open and closed positions, and
wherein engagement of the first valve body and second valve body in fluid tight connection is operative to cause coordinated operative engagement of the lever, the first movable valve element and the second movable valve element, wherein manual movement of the lever is operative to cause each of the first movable valve element and the second movable valve element to simultaneously change between the respective open position and respective closed position responsive to lever movement.

20. Apparatus comprising:
a water filter that is fluidly connectable with an aquarium, wherein the water filter includes
a housing, wherein the housing includes
a base and at least one side wall that bounds a housing interior area,
wherein the housing interior area
includes an opening through which the housing interior area is accessible, houses a plurality of removable filtration cartridges that are operative to remove particles from water that is passed therethrough,
a cover, wherein the cover
is releasably engageable with the housing, and
is operative to close the housing opening in an engaged position, a first valve body, wherein the first valve body
- includes a first valve body inlet and a first valve body outlet,
- houses a first movable valve element,
  - wherein the first movable valve element is movable within the first valve body between a first valve element open position and a first valve element closed position,
    - wherein in the first valve element open position water is enabled to flow through the first valve body between the first valve body inlet and the first valve body outlet, and
    - wherein in the first valve element closed position water is prevented from flowing through the first valve body between the first valve body inlet and the first valve body outlet,
- wherein the first valve body is operative to receive water from a water inlet line, a second valve body, wherein the second valve body
- is in permanent operatively attached connection with the cover, such that when the cover is in the engaged position a second valve body outlet of the second valve body is operative to deliver water to the housing interior area,
- includes a second valve body inlet and the second valve body outlet,
- houses a second movable valve element,
  - wherein the second movable valve element is movable within the second valve body between a second valve element open position and a second valve element closed position,
    - wherein in the second valve element open position water is enabled to flow through the second valve body between the second valve body inlet and the second valve body outlet, and
    - wherein in the second valve element closed position water is prevented from flowing through the second valve body between the second valve body inlet and the second valve body outlet,
- wherein the second valve body outlet is operative to deliver water to the housing interior area,
- wherein the first valve body is manually detachably engageable in fluid tight connection with the second valve body such that when the first and second valve bodies are engaged the first body outlet is in fluid tight connection with the second body inlet, a manual actuator,
- wherein when the first and second valve bodies are engaged in fluid tight connection, movement of the actuator is operative to cause each of the first valve element and second valve element to move simultaneously so that the first and second valve elements are either simultaneously in the first valve element open position and the second valve element open position, or simultaneously in the first valve element closed position and the second valve element closed position, at least one locking projection in fixed operative connection with the second valve body,
- wherein with the first valve body in fluid tight connection with the second valve body, the at least one locking projection is operative
  - when the first and second valve elements are respectively in the first valve element open position and the second valve element open position, to prevent the first valve body and the second valve body from being disengaged from fluid tight connection, and
  - when the first and second valve elements are respectively in the first valve element closed position and the second valve element closed position, to enable the first valve body and the second valve body to be manually disengaged from fluid tight connection.

\* \* \* \* \*